(12) United States Patent
Jarrier

(10) Patent No.: US 8,349,043 B2
(45) Date of Patent: Jan. 8, 2013

(54) TURBINE INLET AIR SYSTEM

(75) Inventor: Etienne Rene Jarrier, Alton Hampshire (GB)

(73) Assignee: General Electric Company, Schenectady, NY (US)

( * ) Notice: Subject to any disclaimer, the term of this patent is extended or adjusted under 35 U.S.C. 154(b) by 63 days.

(21) Appl. No.: 13/025,219

(22) Filed: Feb. 11, 2011

(65) Prior Publication Data

US 2012/0204568 A1    Aug. 16, 2012

(51) Int. Cl.
*B01D 50/00* (2006.01)

(52) U.S. Cl. ............... 55/268; 55/320; 55/323; 55/329; 55/477; 96/108; 96/396

(58) Field of Classification Search .......... 55/302, 55/306, 324, 327, 322, 323, 355, 332, 350.1, 55/497, 501, 521, 482, 485, 528, 428, 495, 55/511, 462, DIG. 17, DIG. 18; 95/268, 95/283, 287, 267; 96/108, 396
See application file for complete search history.

(56) References Cited

U.S. PATENT DOCUMENTS

| | | | | |
|---|---|---|---|---|
| 3,912,471 A * | 10/1975 | Cotton, Jr. ................ 55/440 |
| 4,072,478 A * | 2/1978 | Regehr et al. ............ 55/440 |
| 4,234,323 A * | 11/1980 | Maher ...................... 95/278 |
| 4,926,620 A * | 5/1990 | Donle ....................... 95/202 |
| 5,061,300 A * | 10/1991 | Alexander, III ........... 95/24 |
| 6,071,419 A * | 6/2000 | Beier et al. ............. 210/767 |
| 6,123,751 A * | 9/2000 | Nelson et al. ............ 95/268 |
| 6,368,386 B1 * | 4/2002 | Nelson et al. ............ 95/268 |
| 6,540,805 B2 * | 4/2003 | Ohno et al. .............. 55/486 |
| 7,291,196 B1 | 11/2007 | Lerner |
| 7,632,339 B2 * | 12/2009 | Singh ....................... 95/273 |
| 8,167,980 B2 * | 5/2012 | Hiner et al. .............. 95/268 |
| 8,273,158 B2 * | 9/2012 | Jarrier et al. ............ 95/267 |
| 2007/0294984 A1 | 12/2007 | Chillar et al. |
| 2008/0098891 A1 | 5/2008 | Feher et al. |
| 2008/0298957 A1 | 12/2008 | Chillar et al. |
| 2010/0037777 A1 | 2/2010 | Davis et al. |
| 2010/0050873 A1 | 3/2010 | Hiner et al. |
| 2010/0054919 A1 | 3/2010 | Hiner et al. |
| 2010/0171314 A1 | 7/2010 | Tackett |
| 2010/0251678 A1 | 10/2010 | Mann et al. |
| 2010/0307164 A1 | 12/2010 | Zhang et al. |

FOREIGN PATENT DOCUMENTS

EP    1923118 A1    5/2008

* cited by examiner

*Primary Examiner* — Duane Smith
*Assistant Examiner* — Minh-Chau Pham
(74) *Attorney, Agent, or Firm* — Sutherland Asbill & Brennan LLP

(57) ABSTRACT

The present application provides a turbine inlet air system. The turbine inlet air system may include a small droplet coalescer, a moisture eliminator positioned about the small droplet coalescer, and a filter downstream of the small droplet coalescer and the moisture eliminator.

20 Claims, 3 Drawing Sheets

TURBINE INLET AIR SYSTEM

TECHNICAL FIELD

The present application relates generally to gas turbine engines and more particularly relates to a turbine inlet air system having a coalescer using multiple telltales to agglomerate fine mist or small water droplets into larger droplets.

BACKGROUND OF THE INVENTION

Power generation equipment, such as a gas turbine engine, uses a large supply of intake air to support the combustion process. Inlet air filtration systems thus may be used upstream of the compressor, impure air laden with dust particles, salt, and other contaminants may damage the compressor blades and other types of power plant equipment via corrosion, erosion, and the like. Such damage may reduce the life expectancy and performance of the equipment. To avoid this problem, the inlet air generally passes through a series of filters to remove the contaminants. Known air filters, however, may be clogged by environmental conditions such as fog, rain, snow, and the like. Such clogging may reduce filtration and cooling efficiency while increasing the overall pressure drop. Inlet air pressure loss also can result in the loss of power output for the gas turbine engine as a whole.

Small water droplets such as fog or fine mist may cause such filter failure due to an increased pressure loss across the filter caused by clogging and the like. The potential for clogging is particularly true with final fitters such as pulse cartridges and similar devices. Standard water or mist removal systems may not be sufficiently efficient to remove such small water droplets before contact with the filters and potential damage thereto.

There is a desire therefore for an improved gas turbine inlet air system. Such an improved inlet air system preferably would catch or agglomerate mist or small water droplets so as to prevent damage to downstream filters. Such an inlet air system may increase the output of the gas turbine engine as a whole with increased overall efficiency.

SUMMARY OF THE INVENTION

The present application thus provides a turbine inlet air system. The turbine inlet air system may include a small droplet coalescer, a moisture eliminator positioned about the small droplet coalescer, and a filter downstream of the small droplet coalescer and the moisture eliminator.

The present application further provides a method of limiting the intake of small droplets in a flow of air into a filter of a gas turbine engine. The method may include the steps of passing the flow of air through a number of telltales of a coalescer, agglomerating the small droplets in the flow of air into larger droplets, eliminating the larger droplets in the flow of air in a moisture eliminator, and passing the flow of air through the filter.

The present application further provides a turbine inlet air system for limiting the intake of small droplets in an incoming flow of air. The turbine inlet air system may include a small droplet coalescer with a number of telltales, a moisture eliminator downstream of the small droplet coalescer, a number of filters downstream of the moisture eliminator, and a compressor downstream of the filters.

These and other features and improvements of the present application will become apparent to one of ordinary skill in the art upon review of the following detailed description when taken in conjunction with the several drawings and the appended claims.

DETAILED DESCRIPTION

Figure 1:
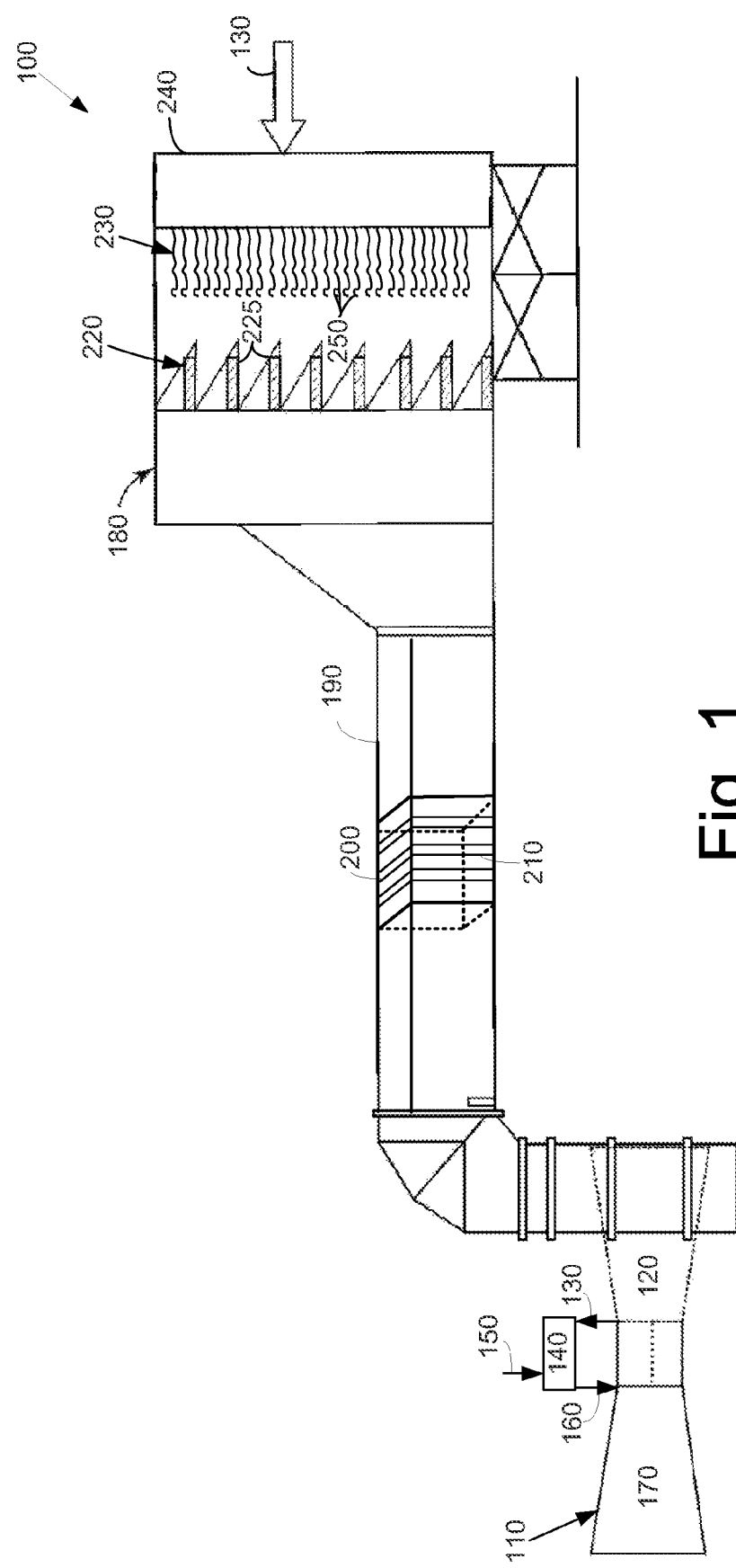
FIG. 1 is a schematic view of a turbine inlet air system as may be described herein.

Referring now to the drawings, in which like numerals refer to like elements throughout the several views, FIG. 1 shows an example of a turbine inlet air system 100 as may be described herein. The turbine inlet air system 100 may be used with a gas turbine engine 110. As is known, the gas turbine engine 110 may include a compressor 120. The compressor 120 compresses an incoming flow of air 130. The compressor 120 delivers the compressed flow of air 130 to a combustor 140. The combustor 140 mixes the compressed flow of air 130 with a compressed flow of fuel 150 and ignites the mixture to create a flow of combustion gasses 160. The flow of combustion gases 160 is in turn delivered to a turbine 170. The flow of combustion gases 160 drives the turbine 170 so as to produce mechanical work. The gas turbine engine 110 may use natural gas, various types of syngas, and/or other types of fuels. The gas turbine engine 110 may be any one of a number of different gas turbine engines offered by General Electric Company of Schenectady, N.Y. and the like. Other components and configurations may be used herein.

The turbine inlet air system 100 may include a weather hood 180. The weather hood 180 may be in communication with the gas turbine engine 10 via an inlet duct 190. A filter house 200 may be positioned about the inlet duct 190. The filter house 200 may have a number of filters 210 therein. The filters 210 may be any type of filtering media. The filters 210 may be arranged in various stages of different capabilities and different configurations. The weather hood 180, the inlet duct 190, the filter house 200, and the filters 210 may have any desired size, shape, or configuration. Other components and other configurations may be used herein.

The weather hood 180 also may include a moisture eliminator 220. The moisture eliminator 220 may include a number of drift eliminators 225 with or without coalescer pads for reducing the moisture content within the incoming flow of air 130. The moisture eliminator 220 also may include vane separators and the like. Any device that causes the incoming flow of air 130 to change direction and/or pass through a mesh so as to reduce the moisture content therein may be used. The moisture eliminator 220 generally is sufficient at removing liquid droplets larger than about twenty (20) microns from the incoming flow of air 130. The moisture eliminator 220 and the components thereon may have any desired size, shape or configuration. Other components and other configurations may be used herein.

The turbine inlet air system 100 may include a small droplet coalescer 230 positioned about an inlet 240 of the weather hood 180. The small droplet coalescer 230 may include a number of telltales 250 positioned about the inlet 240 of the weather hood 180 in the incoming flow of air 130. The telltales 250 may be made out of filaments that are aerodynamically oriented to the direction of the incoming flow of air 130. The telltales 250 may be made of synthetic (plastic) or glass filaments and other types of materials. Any number of telltales may be used 250. The telltales 250 may have any desired size, shape, or configuration.

Figure 2:
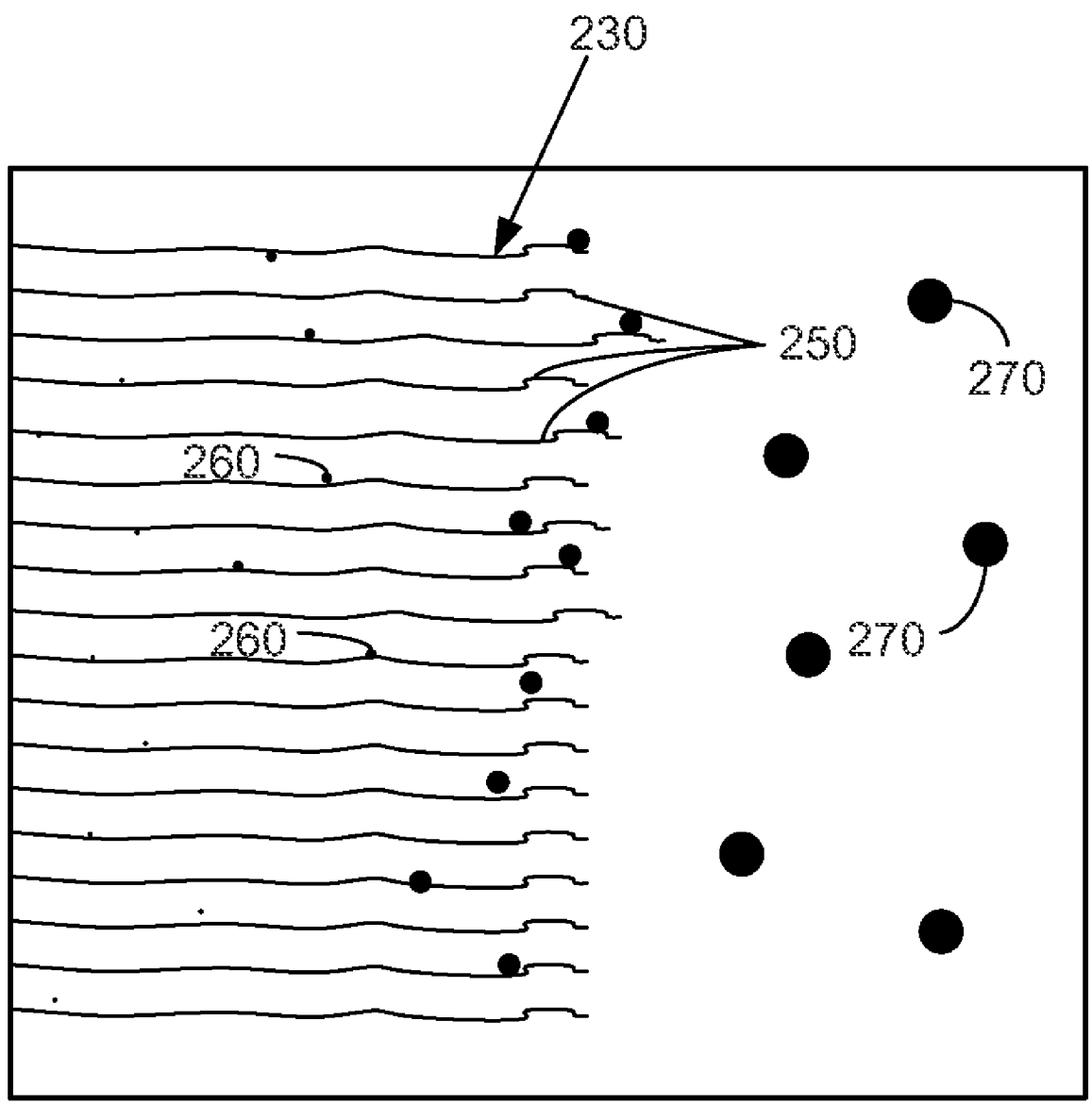
FIG. 2 is a schematic view of a coalescer of the turbine engine inlet air system of FIG. 1 with telltales agglomerating small water droplets into larger water droplets.

As is shown in FIG. 2, the incoming flow of air 130 may include fog or mist in the form of small droplets 260. The telltales 250 of the small droplet coalescer 230 serve to catch or at least slow down the small droplets 260 such that they may agglomerate into larger droplets 270. This agglomerating into larger droplets 270 thus allows the drift eliminators 225 or other components of the moisture eliminator 220 to catch and eliminate the larger droplets 270. This reduction in the small droplets 260 and the elimination of the larger droplets 270 thus should improve the lifetime and efficiency of the filters 210 herein.

The use of the inlet air system 100 with the small droplet coalescer 230 and the telltales 250 thus should provide both increased overall efficiency for the gas turbine engine 110 and improved component lifetime. Specifically, the small droplet coalescer 230 should avoid clogging the filters 210 and the resultant increase in pressure loss thereacross and/or damage thereto. Moreover, the small droplet coalescer 230 should be inexpensive to install and maintain as compared to the cost of repeated early replacement of the filters 210.

Figure 3:
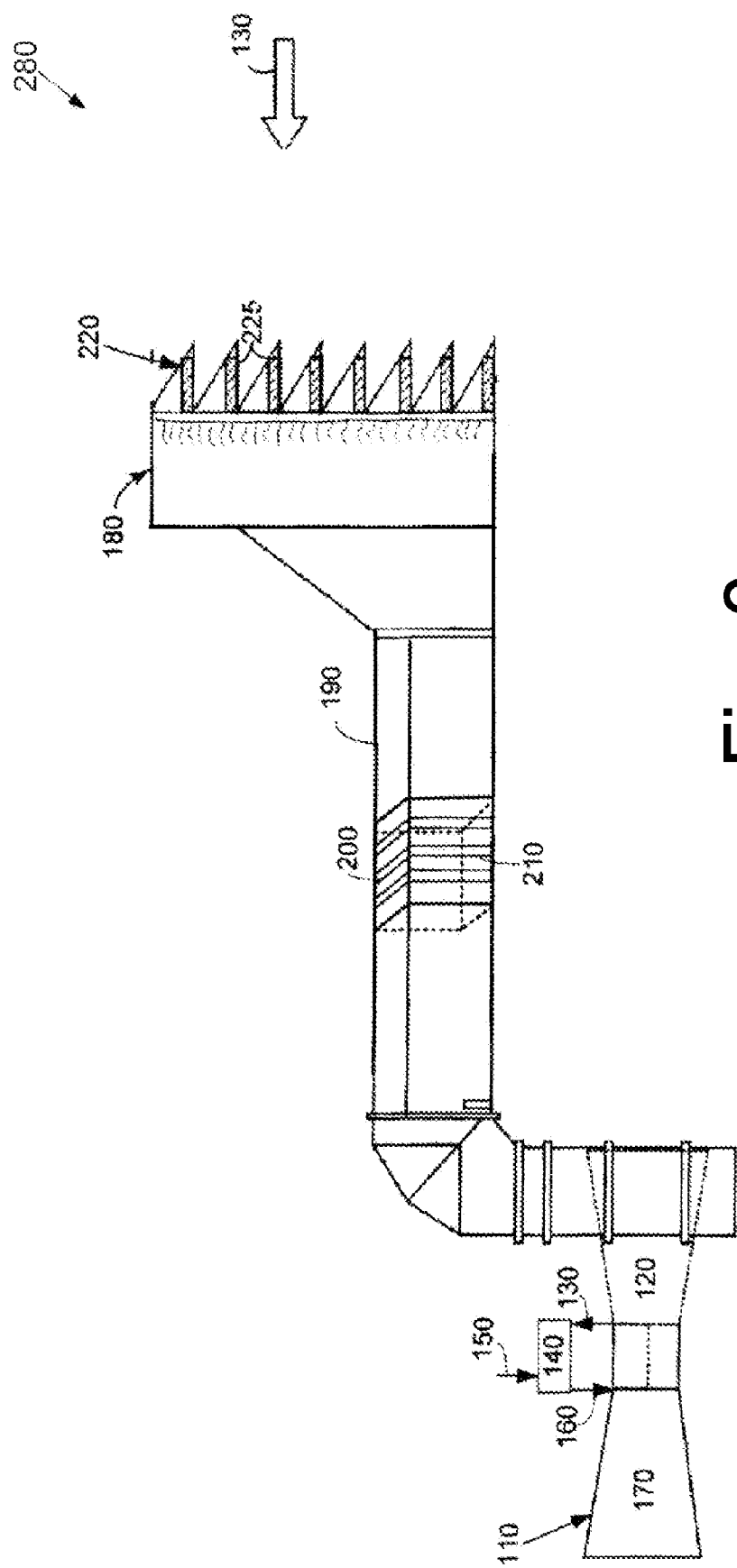
FIG. 3 is a schematic view of an alternative embodiment of a coalescer as may be described herein with the moisture eliminator positioned upstream of the telltales of the coalescer.

FIG. 3 shows an alternative embodiment of a turbine inlet air system 280 as may be described herein. In this embodiment, the moisture eliminator 220 may be positioned upstream of the small droplet coalescer 230 and the telltales 250. The moisture eliminator 220 continues to remove the large droplets 270. The telltales 250 of the small droplet coalescer 230 while trap the small droplets 260 in, for example, mist, fog, or otherwise. The downstream filters 210 may be able to accommodate at least a limited amount of large droplets 270 formed by the telltales 250 but may be clogged or otherwise damaged by the small droplets 260 in mist or fog. Other configurations and other components may be used herein.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

I claim:

1. A turbine inlet air system, comprising:
    a small droplet coalescer comprising a plurality of telltales;
    a moisture eliminator positioned about the small droplet coalescer; and
    a filter downstream of the small droplet coalescer and the moisture eliminator.

2. The turbine inlet air system of claim 1, wherein the plurality of telltales comprise synthetic or glass filaments.

3. The turbine inlet air system of claim 1, wherein the plurality of telltales agglomerates small droplets to twenty (20) micron or more.

4. The turbine inlet air system of claim 1, wherein the small droplet coalescer is positioned about an inlet of a weather hood.

5. The turbine inlet air system of claim 1, wherein the moisture eliminator comprises a drift eliminator.

6. The turbine inlet air system of claim 1, wherein the filter comprises a plurality of filters.

7. The turbine inlet air system of claim 1, wherein the small droplet coalescer is positioned downstream of the moisture eliminator.

8. The turbine inlet air system of claim 1, wherein the small droplet coalescer is positioned upstream of the moisture eliminator.

9. A method of limiting the intake of small droplets in a flow of air into a filter of a gas turbine engine, comprising:
    passing the flow of air through a number of telltales of a coalescer;
    agglomerating the small droplets in the flow of air into larger droplets;
    eliminating the larger droplets in a moisture eliminator; and
    passing the flow of air through the filter.

10. The method of claim 9, further comprising positioning the moisture eliminator downstream of the coalescer in the weather hood.

11. The method of claim 9, further comprising positioning the moisture eliminator upstream of the coalescer in the weather hood.

12. The method of claim 9, wherein the step of agglomerating the small droplets into larger droplets comprises catching the small droplets in the number of telltales of the coalescer.

13. The method of claim 9, wherein the step of agglomerating the small droplets into larger droplets comprises agglomerating the small droplets to larger droplets of twenty (20) microns or more.

14. A turbine inlet air system for limiting the intake of small droplets in an incoming flow of air, comprising:
    a small droplet coalescer;
    the small droplet coalescer comprising a plurality of telltales;
    a moisture eliminator downstream of the small droplet coalescer;
    a plurality of filters downstream of the moisture eliminator; and
    a compressor downstream of the plurality of filters.

15. The turbine inlet air system of claim 14, wherein the plurality of telltales comprise synthetic or glass filaments.

16. The turbine inlet air system of claim 14, wherein the plurality of telltales agglomerate small droplets to twenty (20) micron or more.

17. The turbine inlet air system of claim 14, wherein the moisture eliminator comprises a drift eliminator.

18. The turbine inlet air system of claim 1, wherein each of the plurality of telltales comprises a flexible member having a fixed end and a free end.

19. The method of claim 9, wherein each of the number of telltales comprises a flexible member having a fixed end and a free end.

20. The turbine inlet air system of claim 14, wherein each of the plurality of telltales comprises a flexible member having a fixed end and a free end.

* * * * *

UNITED STATES PATENT AND TRADEMARK OFFICE
CERTIFICATE OF CORRECTION

PATENT NO. : 8,349,043 B2
APPLICATION NO. : 13/025219
DATED : January 8, 2013
INVENTOR(S) : Jarrier Page 1 of 1

It is certified that error appears in the above-identified patent and that said Letters Patent is hereby corrected as shown below:

In Column 1, Line 16, delete "compressor, impure" and insert -- compressor. Impure --, therefor.

In Column 1, Line 31, delete "fitters" and insert -- filters --, therefor.

Signed and Sealed this
Twelfth Day of March, 2013

Teresa Stanek Rea
*Acting Director of the United States Patent and Trademark Office*